United States Patent
Isogai et al.

(10) Patent No.: US 7,754,821 B2
(45) Date of Patent: Jul. 13, 2010

(54) METHOD FOR PRODUCING STABILIZED FLUOROPOLYMER

(75) Inventors: Tomohiro Isogai, Settsu (JP); Tatsuo Suzuki, Settsu (JP)

(73) Assignee: Daikin Industries Ltd., Osaka (JP)

(*) Notice: Subject to any disclaimer, the term of this patent is extended or adjusted under 35 U.S.C. 154(b) by 187 days.

(21) Appl. No.: 12/162,885

(22) PCT Filed: Feb. 5, 2007

(86) PCT No.: PCT/JP2007/051946

§ 371 (c)(1),
(2), (4) Date: Jul. 31, 2008

(87) PCT Pub. No.: WO2007/089016

PCT Pub. Date: Aug. 9, 2007

(65) Prior Publication Data

US 2009/0030154 A1    Jan. 29, 2009

(30) Foreign Application Priority Data

Feb. 3, 2006    (JP)    ............... 2006-027500

(51) Int. Cl.
*C08F 8/22*    (2006.01)
(52) U.S. Cl. .................... 525/340; 525/326.4; 525/343; 525/355; 525/356
(58) Field of Classification Search .............. 525/326.4, 525/340, 343, 355, 356
See application file for complete search history.

(56) References Cited

U.S. PATENT DOCUMENTS

| | | | |
|---|---|---|---|
| 4,743,658 A | 5/1988 | Imbalzano et al. | |
| 5,115,038 A | 5/1992 | Ihara et al. | |
| 5,886,090 A | 3/1999 | Yamana et al. | |
| 6,451,962 B1 | 9/2002 | Hiraga et al. | |
| 2007/0129500 A1* | 6/2007 | Honda et al. | ............. 525/326.2 |

FOREIGN PATENT DOCUMENTS

| | | | |
|---|---|---|---|
| JP | 62104822 A | | 5/1987 |
| JP | 63304033 | * | 12/1988 |
| JP | 03-500547 A | | 2/1991 |
| JP | 04-020507 A | | 1/1992 |
| JP | 04-309532 A | | 11/1992 |
| JP | 6279603 A | | 10/1994 |
| JP | 10-087746 A | | 4/1998 |
| JP | 2000-198813 A | | 7/2000 |
| WO | WO 2004/066426 | * | 8/2004 |
| WO | WO 2008/046816 | * | 4/2008 |

* cited by examiner

*Primary Examiner*—Bernard Lipman
(74) *Attorney, Agent, or Firm*—Sughrue Mion, PLLC

(57) ABSTRACT

It is an object of the present invention to provide a novel method for producing a fluoropolymer according to which unstable terminal groups can be sufficiently stabilized under mild conditions. This invention is related to a method for producing a stabilized fluoropolymer comprising subjecting a fluoropolymer to be treated containing no —$SO_2X$ (X representing F or Cl) group-containing monomer units to the following step A, step B and step C in that order:
A: Step of reacting with a halogenating agent;
B: Step of reacting with a degradation treatment agent;
C: Step of reacting with a fluorinating agent.

8 Claims, No Drawings

METHOD FOR PRODUCING STABILIZED FLUOROPOLYMER

TECHNICAL FIELD

The present invention relates to a method for producing a stabilized fluoropolymer.

BACKGROUND ART

Fluoropolymers, in particular tetrafluoroethylene [TFE]-perfluoro(alkyl vinyl ether) [PAVE] copolymers (hereinafter referred to as "PFAs"), TFE-hexafluoropropylene [HFP] copolymers (hereinafter referred to as "FEPs") and like TFE copolymers, are well-known melt-moldable fluororesins and are widely used as rotational molding materials in manufacturing tubes or pipes, joints, containers or vessels, wire coverings and like moldings, or coatings, linings or hollow moldings.

Due to the mechanisms of polymerization thereof, fluoropolymers generally have one or more thermally unstable terminal groups other than —$CF_3$, for example —COF, —COOH, —$CH_2OH$ and —$COOCH_3$, depending on the polymerization initiator species and chain transfer agent species, among others, used on the occasion of polymerization thereof. The occurrence of such terminal groups in fluoropolymers may cause blowing or hydrofluoric acid generation during molding, which in turn may lead to failure in molding or mold corrosion. Further, in the semiconductor field in which the demand for cleanliness is increasing year by year with the increasing scale of integration of devices, it is strongly desired that these unstable terminal groups be stabilized.

Patent Document 1 (Japanese Kokai Publication S62-104822) describes a method of overcoming this problem which comprises bringing a specific TFE-PAVE copolymer into contact with a fluorine-containing gas under temperature, time and pressure conditions sufficient for removing all unstable terminal groups and further blowing an inert gas against the copolymer to thereby extract the unstable terminal groups therefrom. However, this method requires a long period of contacting with fluorine gas at an elevated temperature and, therefore, it is feared that the contamination of the copolymer as resulting from apparatus corrosion may progress and/or the degradation of the copolymer may affect the physical properties thereof.

On the contrary, in Patent Document 2 (Japanese Kokai Publication H04-20507), there is describes a method which comprises bringing a specific TFE-PAVE copolymer into contact with fluorine gas to attain a total number of —COF and —COOH groups of 7 to 40 per $10^6$ carbon atoms and then further with ammonia gas to convert the —COF groups totally to —$CONH_2$ groups.

On the other hand, in Patent Document 3 (Japanese Kohyo Publication (laid-open Under PCT) H03-500547), a method of stabilizing fluoropolymers is described which comprises bringing a —COF— and —COOH-containing copolymer into contact with an organic amine or a tertiary alcohol to give an intermediate and, after drying the same, fluorinating the same to accomplish the fluorination at lower temperatures as compared with the conventional methods of —COF fluorination.

However, this method has the problem of byproduct —COF formation during intermediate fluorination as well and, in the case of a copolymer having a terminal group low in reactivity with the organic amine or tertiary alcohol, for example —$CH_2OH$ or —$COOCH_3$, the problem that the copolymer will not be converted to the desired intermediate but the terminal group will remain unreacted.

Further, Patent Document 4 (Japanese Kokai Publication H06-279603) describes a method of fluorinating the surface of a carbonaceous material-containing molded article with a reactant gas comprising a fluorine atom-containing compound after preliminary oxidation of the surface in the manner of gaseous phase oxidation, liquid phase oxidation or electrolytic oxidation. In particular, —COF can be converted to —COOH with ease by treatment with steam and the above method can be said to be effective and economical as compared with other methods of oxidation; however, in the case of a copolymer having an unstable group(s) other than —COOH or —COF, the method is not always effective. This method is nothing but a molding surface treatment method and no mention is made of carbonaceous material-free fluoropolymers. Further, in the case of copolymers having a terminal group difficult to fluorinate, no effective oxidation treatment method is available and the terminal group remains unreacted, causing the problem of insufficient stabilization.

DISCLOSURE OF INVENTION

Problems which the Invention is to Solve

In view of the above-discussed state of the art, it is an object of the present invention to provide a novel method of producing fluoropolymers according to which unstable terminal groups can be sufficiently stabilized under mild conditions.

Means for Solving the Problems

The present invention provides a method for producing a stabilized fluoropolymer comprising subjecting a fluoropolymer to be treated containing no —$SO_2X$ (X representing F or Cl) group-containing monomer units to the following step A, step B and step C in that order:

A: Step of reacting with a halogenating agent;
B: Step of reacting with a degradation treatment agent;
C: Step of reacting with a fluorinating agent.

The invention also provides a method for producing a stabilized fluoropolymer comprising subjecting a fluoropolymer to be treated containing no —$SO_2X$ (X representing F or Cl) group-containing monomer units to stabilization treatment, the stabilization treatment comprises the following steps P and Q:

P: Step of obtaining a fluoropolymer in which at least 90% of the unstable terminal groups are —CFTCOOZ groups (in which T represents F, a perfluoroalkyl group or a perfluoroalkoxy group; the perfluoroalkyl group or perfluoroalkoxy group may contain at least one ether oxygen (—O—); Z represents H, $NR^1R^2R^3R^4$ or an alkali metal element; $R^1, R^2, R^3$ and $R^4$ may be the same or different and each represents H or an alkyl group containing 1 to 4 carbon atoms);

Q: Step of converting the above-mentioned —CFTCOOZ to —$CF_2T$ (T and Z being as defined above) by reaction with a fluorinating agent.

The invention further relates to a tubular molded article obtained by molding a fluoropolymer in which the fluoropolymer is a stabilized fluoropolymer produced by the stabilized fluoropolymer production method according to the invention.

The invention further relates to a covered electric wire comprising a core conductor and a covering, wherein the covering is molded using a stabilized fluoropolymer produced by the stabilized fluoropolymer production method according to the invention.

The invention further relates to an optical functional material, in which it is molded using a stabilized fluoropolymer produced by the stabilized fluoropolymer production method according to the invention.

The invention further relates to an optical waveguide comprising a core and a cladding in which at least one of the core and cladding is molded using a stabilized fluoropolymer produced by the stabilized fluoropolymer production method according to the invention.

The invention further relates to an antireflective film material in which it is produced using a stabilized fluoropolymer produced by the above-mentioned stabilized fluoropolymer production method according to the invention.

Finally, the invention relates to an article injection-molded using a fluoropolymer in which the fluoropolymer is a stabilized fluoropolymer produced by the stabilized fluoropolymer production method according to the invention.

In the following, the invention is described in detail.

While the stabilized fluoropolymer production method (1) and the stabilized fluoropolymer production method (2) differ in constitution in that the fluoropolymer to be treated is treated in the steps A, B and C in the former while the unstable terminal group-containing fluoropolymer to be treated is treated in the steps P and Q in the latter, as mentioned above, the stabilized fluoropolymer production method according to the invention is first described with respect to particulars common to both methods in the following.

In the present specification, the "stabilized fluoropolymer production method" according to the invention, so referred to without adding the number (1) or (2) or without any other addition, conceptually includes the stabilized fluoropolymer production method (1) and stabilized fluoropolymer production method (2).

The stabilized fluoropolymer production method according to the invention is a stabilized fluoropolymer production method comprising subjecting a fluoropolymer to be treated to a treatment process comprising the specific steps to be described later herein to produce a stabilized fluoropolymer. Generally used as the fluoropolymer to be treated is an unstable terminal group-containing fluoropolymer.

The above treatment is a treatment for stabilizing the above-mentioned unstable terminal groups and is sometimes referred to herein as "unstable terminal group stabilization treatment" or as "stabilization treatment" for short.

The fluoropolymer to be treated so referred to herein is a fluoropolymer which is the target of unstable terminal group stabilization treatment.

The fluoropolymer is one obtained by polymerization of one or more fluorine-containing monomers and may be one resulting from copolymerization with a fluorine-free monomer or monomers.

The fluorine-containing monomer is not particularly restricted but may any fluorine-containing polymerizable compound, for example a fluoroolefin, a fluorinated alkyl vinyl ether or a fluorinated cyclic monomer.

As the fluoroolefin, there may be mentioned those ethylenic fluoromonomers that are to be mentioned later herein.

The fluorinated alkyl vinyl ether is not particularly restricted but includes, for example, fluorovinyl ethers represented by the general formula:

$$CF_2=CF-O-Rf^1$$

wherein $Rf^1$ represents a fluoroalkyl group containing 1 to 9 carbon atoms or a fluoropolyether group containing 1 to 9 carbon atoms, and hydrogen-containing fluorinated alkyl vinyl ethers represented by the general formula:

$$CHY^1=CF-O-Rf^2$$

wherein $Y^1$ represents H or F and $Rf^2$ represents a straight or branched fluoroalkyl group containing 1 to 9 carbon atoms, which may optionally contain one or more ether oxygen atoms.

The fluoropolymer to be treated may be one resulting from (co)polymerization of one or more of the above-mentioned alkyl vinyl ethers.

As the fluorinated cyclic monomer, there may be mentioned perfluorodioxoles such as perfluoro-1,3-dioxol derivatives represented by the formula given below.

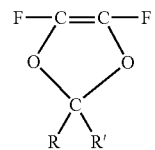

(In the above formula, R and R' are the same or different and each represents F, H, an alkyl group containing 1 to 10 carbon atoms or a fluoroalkyl group containing 1 to 10 carbon atoms.)

The fluorine-free monomer is, for example, a hydrocarbon-based monomer reactive with the fluorine-containing monomer mentioned above. As the hydrocarbon-based monomer, there may be mentioned, for example, alkenes, alkyl vinyl ethers, vinyl esters, alkyl allyl ethers and alkyl allyl esters.

The fluoropolymer preferably contains ethylenic fluoromonomer-derived ethylenic fluoromonomer units.

The ethylenic fluoromonomer is a vinyl group-containing fluoromonomer containing no ether oxygen [—O—]. The hydrogen atoms of the vinyl group may be partly or wholly substituted by a fluorine atom or atoms.

The term "ether oxygen" as used herein means the structure —O— which is a constituent of the monomer molecule.

As the ethylenic fluoromonomer, there may be mentioned, for example, haloethylenic fluoromonomers represented by the general formula:

$$CF_2=CF-Rf^3$$

wherein $Rf^3$ represents F, Cl or a straight or branched fluoroalkyl group containing 1 to 9 carbon atoms, and hydrogen-containing fluoroethylenic fluoromonomers represented by the general formula:

$$CHY^2=CFY^3$$

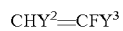

wherein $Y^2$ represents H or F and $Y^3$ represents H, F, Cl or a straight or branched fluoroalkyl group containing 1 to 9 carbon atoms.

As the above ethylenic fluoromonomer, there may be mentioned, for example, tetrafluoroethylene [TFE], hexafluoropropylene [HFP], chlorotrifluoroethylene [CTFE], vinyl fluoride, vinylidene fluoride [VDF], trifluoroethylene, hexafluoroisobutylene and perfluorobutylethylene.

The ethylenic fluoromonomer preferably comprises at least one species selected from the group consisting of $CF_2=CF_2$, $CH_2=CF_2$, $CF_2=CFCl$, $CF_2=CFH$, $CH_2=CFH$ and $CF_2=CFCF_3$; among them, perhaloethylenic fluoromonomers are more preferred, perfluoroethylenic fluoromonomers are still more preferred, and TFE is most preferred.

The fluoropolymer to be treated may be one produced by (co)polymerizing one or more of such ethylenic fluoromonomers as mentioned above.

Preferred as the fluoropolymer to be treated are copolymers which are obtained by copolymerization of at least one of the ethylenic fluoromonomers and at least one of the fluorinated alkyl vinyl ethers mentioned above, hence are at least binary; more preferred are binary copolymers produced by copolymerization of the above-mentioned ethylenic fluoromonomer and the above-mentioned fluorinated alkyl vinyl ether.

The fluoropolymer to be treated to be used in the practice of the invention is preferable one containing the repeating unit derived from at least one monomer selected from the group consisting of $CF_2=CF_2$, $CF_2=CFCF_2Rf^4$, $CF_2=CF-OCF_2Rf^4$, $CF_2=CF-ORf^5CF=CF_2$ ($Rf^4$ representing a fluoroalkyl group containing 1 to 10 carbon atoms and $Rf^5$ representing a fluoroalkylene group containing 1 to 8 carbon atoms, which may optionally contain an ether oxygen atom(s)) and perfluoro-1,3-dioxole derivatives, more preferably a TFE-based copolymer containing the repeating unit derived from $CF_2=CF_2$.

The TFE-based copolymer is preferably a copolymer of $CF_2=CF_2$ and a perfluoro(alkyl vinyl ether) [PAVE] and/or HFP, more preferably a TFE/PAVE [PFA] copolymer or TFE/HFP copolymer, still more preferably a TFE/perfluoro(propyl vinyl ether) copolymer.

The TFE-based copolymer is preferably a perfluoroelastomer.

In the practice of the invention, the fluoropolymer to be treated is preferably an at least binary copolymer produced by copolymerizing the above-mentioned ethylenic fluoromonomer and a monomer copolymerizable with the ethylenic fluoromonomer.

The monomer copolymerizable with the ethylenic fluoromonomer is, for example, a fluorinated alkyl vinyl ether.

In the practice of the invention, the fluoropolymer to be treated is preferably one composed of 50 to 100 mole percent of the ethylenic fluoromonomer unit and 0 to 50 mole percent of the fluorinated alkyl vinyl ether.

A more preferred lower limit to the ethylenic fluoromonomer unit content is 65 mole percent, a still more preferred lower limit thereto is 70 mole percent, a more preferred upper limit thereto is 90 mole percent, and a still more preferred upper limit thereto is 87 mole percent.

A more preferred upper limit to the fluorinated alkyl vinyl ether unit content is 20 mole percent and a still more preferred upper limit is 10 mole percent.

The "monomer unit" such as the above-mentioned fluorinated alkyl vinyl ether unit or ethylenic fluoromonomer unit means the moiety which constitutes a part of the molecular structure of the fluoropolymer to be treated and is derived from the molecular structure of the monomer. For example, the TFE unit is the moiety [—$CF_2$—$CF_2$—] derived from TFE [$CF_2=CF_2$].

The fluoropolymer to be treated to be used in the practice of the invention contains no —$SO_2X$ (X representing F or Cl) group-containing monomer unit.

The fluoropolymer to be treated which contains no —$SO_2X$ (X being as defined above) group-containing monomer unit can be fluorinated efficiently, irrespective of the moisture content in the fluorination target.

The "unstable terminal group" which the fluorination target fluoropolymer to be treated in accordance with the invention means any group that may be formed in each of the step A and step B to be described later herein. The unstable terminal group can be converted to a stable terminal group when the step C is further carried out.

As the unstable terminal group, there may be mentioned, for example, groups represented by the following formulas (1)-(7):

—$CFTR^5(OH)_{n1}$     (1)

—$CFT$-$(R^6)_{n2}$—$OR^7$     (2)

—$CFT$-$(R^8)_{n3}$—$COR^9$     (3)

—$CFT$-$(R^{10})_{n4}$—$OCOOR^{11}$     (4)

—$CFTCONR^{12}R^{13}$     (5)

—$CFTCOOR^{14}$     (6)

—$CFTR^{15}$     (7)

(In the above formulas, T represents F, a perfluoroalkyl group or a perfluoroalkoxy group, $R^5$ represents a hydrocarbon group containing 1 to 10 carbon atoms the hydrogen atoms of which may partly or totally be substituted by a halogen atom or atoms, $R^6$, $R^8$ and $R^{10}$ each represents an alkylene group containing 1 to 10 carbon atoms the hydrogen atoms of which may partly or totally be substituted by a halogen atom or atoms, $R^7$, $R^9$, $R^{11}$, $R^{12}$, $R^{13}$ and $R^{14}$ each represents an alkyl group containing 1 to 10 carbon atoms the hydrogen atoms of which may be partly, but not totally, be substituted by a halogen atom or atoms ($R^{12}$ and $R^{13}$ in formula (5) being the same or different), $R^{15}$ represents H or an alkyl group containing 1 to 10 carbon atoms the hydrogen atoms of which may be partly, but not totally, be substituted by a halogen atom or atoms, n1 represents an integer of 1 to 3, and n2, n3 and n4 each represents the integer 0 or 1. The perfluoroalkyl group and perfluoroalkoxy group mentioned above each may contain an ether oxygen atom(s). X is as defined above.)

The perfluoroalkyl group represented by T preferably contains 1 to 10 carbon atoms, and the perfluoroalkoxy group represented by T preferably contains 1 to 15 carbon atoms.

The hydrocarbon group represented by $R^5$ may be an acyclic aliphatic hydrocarbon group or an alicyclic hydrocarbon group or an aromatic hydrocarbon group such as phenyl.

As the unstable terminal group, there may be mentioned, for example, —$CF_2CO_2CH_3$, —$CF_2CH_2OH$ and —$CF_2CONH_2$, among others.

The fluoropolymer to be treated to be used in the practice of the invention may contain, in addition to one or more of the unstable terminal groups mentioned above, one or more of such other unstable terminal groups as —$CF_2COOH$, —$CF_2COF$, —$CF_2R^{16}$ ($R^{16}$ representing an alkyl group containing 1 to 10 carbon atoms), —$CF=CF_2$ and —$CF_2H$.

The unstable terminal group and other terminal group are not particularly restricted to but may include, for example, (i) groups derived from the polymerization initiator, chain transfer agent or/and polymerization terminator added in the polymerization reaction for obtaining the fluoropolymer to be treated; (ii) groups resulting from unimolecular termination (e.g. β-scission of a vinyl ether); and (iii) groups derived from these terminal groups by further modification under the action of water, an alcohol and/or an amine, among others, possibly occurring in the surrounding environment prior to treatment according to the invention.

As the groups (i) derived from the polymerization initiator, chain transfer agent or/and polymerization terminator, there may be mentioned, for example, such groups corresponding to the formula (1) to (4), (6) or (7) as (i-a) —$CF_2OCOOCH_2CH_2CH_3$ formable in the case of di-n-propyl peroxydicarbonate being used as the polymerization initiator; (i-b) —$CF_2CH_2OH$ formed in a proportion of about 10 to 50% relative to all polymer termini in the case of methanol being used as the chain transfer agent; (i-c) —$CF_2CH_2OCH_3$ formable in the case of dimethyl ether being used as the chain transfer agent; (i-d) —$CF_2CH_2COCH_3$ formable in the case of acetone being used as the chain transfer agent; (i-e) —$CF_2CH_2CH_3$ formable in a proportion of about 10 to 50% relative to all polymer termini in the case of ethane being used as the chain transfer agent; and (i-f) —$CF_2CONH_2$ formable in a proportion of about 10 to 80% relative to all polymer termini in the case of methanol being used as the polymerization terminator.

The group (ii) formable by unimolecular termination is, for example, —$CF_2COF$.

As the above-mentioned terminal groups (iii) derived from the terminal groups once formed upon polymerization by modification by means of the surrounding medium, there may be mentioned, for example, the one resulting from conversion of the above-mentioned —$CF_2COF$ to the carboxyl group under the action of possibly coexisting water (—$CF_2CO_2H$ etc.), those resulting from ester bond formation of the above-mentioned —$CF_2COF$ with a possibly coexisting alcohol (—$CF_2CO_2CH_3$, —$CF_2CO_2C_2H_5$, etc.) and those resulting from conversion of the above-mentioned —$CF_2COF$ to an amide bond in the case of an amine or ammonia being used (—$CF_2CONH_2$, —$CF_2CON(CH_3)_2$, etc.), among others.

Also includible among the further modified groups (iii) are the terminal groups of formula (5) or (6) mentioned above as the unstable terminal groups to be stabilized in accordance with the invention.

In cases where the unstable terminal group in the fluoropolymer to be treated comprises at least one of the groups represented by the formulas (1) to (7), the unstable terminal group can be easily converted to a readily degradable group in the step A to be described later herein and the conversion can be carried out even under mild conditions and, therefore, the stabilized fluoropolymer can be produced with high efficiency. In particular, when the terminal group is a group selected from the group consisting of groups of the formulas (1), (3), (5) and (6), the terminal group stabilization can be carried out more easily.

In cases where the unstable terminal group is a group represented by a formula selected from the group consisting of (2), (4) and (7), the technique of causing an oxidizing gas, such as oxygen, to coexist in the step A to be described later herein is effective.

The fluoropolymer to be treated is generally a set of a plurality of fluoropolymer to be treated molecules.

The set of a plurality of fluoropolymer to be treated molecules may be a set of fluoropolymer to be treated molecules having an unstable terminal group and fluoropolymer to be treated molecules free from unstable terminal groups.

In the set of a plurality of fluoropolymer to be treated molecules, there may exist at least one such unstable terminal group as mentioned above. Generally, however, there exist a plurality of such groups.

In the set of a plurality of fluoropolymer to be treated molecules, the plurality of unstable terminal groups may be of a single species or of two or more species. The two or more unstable terminal group species may be contained in each fluoropolymer to be treated molecule or the unstable terminal group species is optionally partly or wholly different in each fluoropolymer to be treated molecule.

The plurality of unstable terminal groups may all be converted in the treatment process according to the present invention to groups of the same species or they may be converted to groups of different species according to the unstable terminal group species, or the plurality of groups may partly remain unconverted.

The term "unstable terminal group" as used herein, when literally interpreted, may be considered to further include those readily degradable terminal groups, readily fluorinatable terminal groups and —CFTCOOZ groups (in which T is as defined above and Z represents H, $NR^1R^2R^3R^4$ or an alkali metal element; $R^1$, $R^2$, $R^3$ and $R^4$ may be the same or different and each represents H or an alkyl group containing 1 to 4 carbon atoms) which may be formed in the treatment process to be described later herein. As far as the stabilized fluoropolymer production method (1) according to the invention is concerned, however, the unstable terminal groups are generally those groups which the fluoropolymer to be treated has prior to treatment, while the readily degradable terminal groups are groups formed upon subjecting the unstable terminal groups to the step A to be described later herein and the readily fluorinatable terminal groups are groups formed upon subjecting the readily degradable terminal group to the step B to be described later herein and the —CFTCOOZ groups (T and Z being as defined above) are species included among the above-mentioned unstable terminal groups in the stabilized fluoropolymer production method (2) according to the invention and, in these respects, the unstable terminal groups, readily degradable terminal groups, readily fluorinatable terminal groups and —CFTCOOZ groups are conceptually distinguishable from one another.

In the practice of the invention, the fluoropolymer to be treated can be prepared by any method known in the art, for example by solution polymerization, suspension polymerization or emulsion polymerization. Emulsion polymerization or suspension polymerization is preferred, however, since the stabilized fluoropolymer production method according to the invention is then most effective.

The fluoropolymer to be treated may have any of the resin powder, pellet and molded membrane forms. For carrying out the steps to be described later herein to a satisfactory extent, the fluoropolymer to be treated is preferably in the form of a resin powder and, from the industrial handleability viewpoint, it is desirably in the form of pellets.

According to the stabilized fluoropolymer production method (1) of the invention, the above-mentioned fluoropolymer to be treated is subjected to the following steps A, B and C in that order.

A Step of reacting with a halogenating agent;
B Step of reacting with a degradation treatment agent;
C Step of reacting with a fluorinating agent.

The step A is generally a step (step A1) of converting the unstable terminal groups to readily degradable terminal groups by reacting with a halogenating agent.

The halogenating agent preferably comprises at least one species selected from the group consisting of $F_2$, $NF_3$, $SF_4$, $PF_5$, $IF_5$, $IF_7$, $Br_2$, $BrF_3$, $BrF_5$, $AgF_2$, $CoF_3$, $K_3NiF_7$, $Cl_2$, $SCl_2$, $SCl_4$, $PCl_3$, $POCl_3$, $PCl_5$, $ClF$ and $ClF_3$.

The halogenating agent is more preferably $F_2$ or $SF_4$ in view of the easy handleability thereof.

Where necessary, the halogenating agent may also be used in admixture with an oxidizing gas such as oxygen.

When the halogenating agent is a gaseous compound, it may be used in a form diluted to 5 to 95% by mass with an inert gas such as nitrogen.

The treatment with the halogenating agent mentioned above is preferably carried out at 0 to 180° C. By carrying out the reaction with the halogenating agent within such temperature range, it becomes possible to inhibit the fluoropolymer to be treated from being damaged by carbon-carbon double bond formation or main chain cleavage, among others, while maintaining the conversion to readily degradable terminal groups at high levels.

A more preferred lower limit to the above treatment temperature is 20° C., a still more preferred lower limit is 50° C., amore preferred upper limit is 140° C., and a still more preferred upper limit is 130° C.

As for the pressure, the step A is preferably carried out at a gage pressure of −0.08 to 3 MPa although the pressure may vary depending on the halogenating agent employed and the fluoropolymer to be treated, among others. A more preferred lower limit to the pressure is −0.05 MPa and a more preferred upper limit is 1 MPa.

The "readily degradable terminal groups" so referred to herein are groups resulting from conversion of the above-mentioned unstable terminal groups under the action of the halogenating agent and are groups convertible to readily fluorinatable groups by reacting the same with a degradation treatment agent in the step B.

As the readily degradable terminal groups, there may be mentioned, for example, groups of the formula —CFTCOX$^1$ (T being as defined above and X$^1$ representing F or Cl) or —CFTCOORx (T being as defined above and Rx representing a haloalkyl group). The number of halogen atoms in the above group Rx is generally larger than the number of halogen atoms which the above-mentioned group R$^{14}$ has.

The readily degradable terminal group preferably comprises at least one species selected from the group consisting of the above-mentioned —CFTCOX$^1$ and —CFTCOORx groups (in each formula, T, X$^1$ and Rx being as defined above). Preferred as the —CFTCOX$^1$ group is —CFTCOF. Preferred as the above —CFTCOORx group are those in which Rx is a haloalkyl group containing 1 to 3 carbon atoms; more preferred are those in which Rx is a perhaloalkyl group containing 1 to 3 carbon atoms; still more preferred are —CFTCOOCX$^1_3$ and like groups; particularly preferred are —CFTCOOCF$_3$ groups (T, X, and Rx in the above formulas being as defined above).

By reacting with the halogenating agent in the above-mentioned step A, it is possible to convert the unstable terminal groups represented by the formula (1), (2), (3), (4), (5) or (7) given above to the readily degradable terminal —CFTCOF groups (T being as defined above) and, in the case of the unstable terminal groups represented by the formula (6) given above, convert them to the readily degradable terminal —CFTCOOCX$_{n5}$H$_{3-n5}$ groups (in which T is as defined above, X is F or Cl and n5 is 1, 2 or 3) resulting from substitution of at least one hydrogen atom in the alkyl group —R$^{14}$ by a halogen atom. In the case of the groups represented by the formula (7), among the above groups, one or more hydrogen atoms in the alkyl group —R$^{15}$ are substituted by a fluorine atom or atoms upon halogenating agent treatment and, in this case, a technique is preferably employed which comprises converting those groups once to —CFTCOX$^1$ groups (T and X$^1$ being as defined above) in the presence of an oxidizing agent, such as oxygen, in addition to the halogenating agent so that a sufficient degree of conversion to —CF$_2$T groups (T being as defined above) may be attained at relatively low temperatures and in a shorter period of time.

The step B is preferably a step of converting the above-mentioned readily degradable terminal groups to readily fluorinatable terminal groups by the action of the degradation treatment agent.

Water is preferred as the degradation treatment agent. The degradation treatment agent may be either a liquid degradation treatment agent or a gaseous degradation treatment agent but preferably is a gaseous degradation treatment agent. When water is used as the degradation treatment agent, the step can be simplified since the readily degradable terminal groups are very susceptible to water and can be converted to readily fluorinatable terminal groups upon mere contact with moist air.

The amount of the degradation treatment agent to be used in the above-mentioned step B may be properly selected according to the degradation treatment agent species employed. When a liquid degradation treatment agent is used, the amount thereof is 1 to 10000 parts by mass per 100 parts by mass of the fluoropolymer to be treated after the step A.

The above step B is preferably carried out at a temperature of 0 to 180° C. A more preferred lower limit to the above temperature range is 20° C. and a still more preferred lower limit thereto is 50° C., while a more preferred upper limit thereto is 140° C. and a still more preferred upper limit thereto is 130° C.

When a gaseous degradation treatment agent is used, the above step B is preferably carried out at a gage pressure of −0.08 to 3 MPa. A more preferred lower limit to the above pressure range is −0.05 MPa and a more preferred upper limit thereto is 1 MPa.

The "readily fluorinatable terminal groups" so referred to herein are groups obtained upon degradation of the above-mentioned readily degradable terminal groups and are groups relatively easy to fluorinate.

Since, generally, the readily fluorinatable terminal groups are fluorinated more easily than the readily degradable terminal groups, it becomes possible, by once converting the readily degradable terminal groups to readily fluorinatable terminal groups and then reacting the latter with a fluorinating agent, to increase the overall degree of fluorination at the terminal groups after treatment.

As the above-mentioned readily fluorinatable groups, there may be mentioned groups of the formula —CFTCOOZ (in which T is as defined above and Z represents H, NR$^1$R$^2$R$^3$R$^4$ or an alkali metal element; R$^1$, R$^2$, R$^3$ and R$^4$ are the same or different and each represents H or an alkyl group containing 1 to 4 carbon atoms), among others. The —CFTCOOZ groups can be readily converted to —CF$_2$T groups (T being defined as above) in the step C.

From the fluorination efficiency viewpoint in the step C, H is generally preferred as the moiety Z, although the above-mentioned NR$^1$R$^2$R$^3$R$^4$ or alkali metal element, among others, when it occurs in the reaction medium, exerts an influence.

The step B is preferably a step B1 of converting the above-mentioned readily degradable terminal groups to —CFTCOOZ (T and Z being as defined above) by reacting with the above-mentioned degradation treatment agent since the fluorination in the step C is facilitated then.

The step C is preferably a step of converting the readily fluorinatable terminal groups to —CF$_2$T (T being as defined above) by reaction with a fluorinating agent.

Generally, the fluorinating agent in the step C preferably comprises at least one fluorine source selected from the group consisting of F$_2$, NF$_3$, SF$_4$, PF$_5$, IF$_5$, IF$_7$, BrF$_3$, BrF$_5$, ClF, ClF$_3$, AgF$_2$, CoF$_3$ and K$_3$NiF$_7$. More preferred as the fluorine source is F$_2$.

The fluorinating agent is preferably a gaseous fluorinating agent.

The gaseous fluorinating agent comprises such a fluorine source as mentioned above and a gas inert to fluorination.

The gas inert to fluorination is not particularly restricted but may be, for example, nitrogen gas or argon gas.

When the above-mentioned fluorine source is a gaseous fluorinating agent, it preferably amounts to not less than 1% by mass, more preferably not less than 10% by mass, of the gaseous fluorinating agent mentioned above and, within the above range, the proportion thereof may be 50% by mass or lower.

When a gaseous degradation treatment agent is used, the above-mentioned step C is preferably carried out at a gage pressure of −0.08 to 3 MPa. A more preferred lower limit to the above-mentioned pressure is a gage pressure of −0.05 MPa and a more preferred upper limit thereto is 1 MPa.

In the step C, the reaction with the fluorinating agent is preferably carried out at 0 to 180° C.

The above temperature is more preferably not lower than 20° C., still more preferably not lower than 50° C., and more preferably not higher than 140° C., still more preferably not higher than 130° C.

By carrying out the reaction with the fluorinating agent in such temperature range, it becomes possible to inhibit the fluoropolymer to be treated from being damaged by carbon-carbon double bond formation and/or main chain cleavage, among others, while maintaining the rate of conversion to —$CF_2T$ at a high level.

In the above step C, either a continuous procedure or a batchwise procedure is possible.

The apparatus to be used in the above fluorination treatment may be properly selected from among stationary reactors such as tray reactors and cylindrical reactors; reactors equipped with an impeller; rotating (tumbling) vessel reactors such as rotary kilns, double cone reactors and V-shaped reactors; vibratory reactors; various fluidized bed reactors such as agitating fluidized bed reactors; and so forth. When the treatment target is in the form of a resin powder or pellets, the fluorination treatment is preferably carried out using a rotating vessel reactor or vibratory reactor since then the reaction temperature can be maintained with ease.

In carrying out the stabilized fluoropolymer production method (1) according to the invention, it is preferred that the step A be the above-mentioned step A1, the step B be the above-mentioned step B1 and the step C be a step C1 of converting the above-mentioned —CFTCOOZ to —$CF_2T$ (T and Z being as defined above) by the action of the fluorinating agent.

The stabilized fluoropolymer production method (2) according to the invention comprises subjecting the fluoropolymer to be treated to stabilization treatment comprising the steps P and Q to be described below.

The fluoropolymer to be treated does not contain any —$SO_2X$ (X representing F or Cl) group-containing monomer units, as mentioned hereinabove.

P: Step of obtaining a fluoropolymer in which at least 90% of the unstable terminal groups are —CFTCOOZ groups (in which T represents F, a perfluoroalkyl group or a perfluoroalkoxy group; Z represents H, $NR^1R^2R^3R^4$ or an alkali metal element; $R^1$, $R^2$, $R^3$ and $R^4$ may be the same or different and each represents H or an alkyl group containing 1 to 4 carbon atoms; the perfluoroalkyl group or perfluoroalkoxy group may contain at least one ether oxygen (—O—));

Q: Step of converting the above-mentioned —CFTCOOZ to —$CF_2T$ (T and Z being as defined above) by reaction with a fluorinating agent.

In the above-mentioned step P, the "unstable terminal groups" conceptually include the unstable terminal groups mentioned above referring to the fluoropolymer to be treated as well as such unstable terminal groups as —$CF_2COOH$, —$CF_2COF$ and —CF=$CF_2$ other than the unstable terminal groups mentioned above.

The step P may comprise any operation or operations that can give a fluoropolymer in which at least 90% of the unstable terminal groups are —CFTCOOZ groups. For example, the above-mentioned step A and step B may be carried out, or the fluoropolymer to be treated may be brought into contact with an oxidizing agent, followed by hydrolysis of the resulting —CFTCOF with water or the like. The oxidizing agent is, for example, ozone. The ozone may be accompanied by water vapor. An alternative method comprises treating the fluoropolymer to be treated at an elevated temperature of 200 to 300° C. and then hydrolyzing the resulting —CFTCOF with water or the like. In the case of treatment of the fluoropolymer to be treated at an elevated temperature of 200 to 300° C., the treatment may be carried out under vacuum (0.02 MPa or lower) and, as for the treatment time, the treatment can be carried out for 0.1 hour or longer, for instance.

The step P preferably comprises the above-mentioned step A and step B.

As the fluorinating agent to be used in the step Q, there may be mentioned the same ones as mentioned hereinabove referring to the step C and, among them, those containing $F_2$ or $SF_4$ as a fluorine source are preferred.

The fluorinating agent is preferably used in a diluted form in the same manner as in the above-mentioned step C.

The reaction conditions in the step Q are not particularly restricted but may vary depending on the fluorinating agent employed and the fluoropolymer to be treated species, among others. It is preferred, however, that the reaction be carried out at a pressure of −0.08 to 3 MPa.

The step Q is applied to the fluoropolymer that has undergone the step P and therefore can be carried out at a temperature of 0 to 180° C.

A preferred lower limit to the above temperature is 20° C., a more preferred lower limit thereto is 50° C., a preferred upper limit thereto is 140° C., and a more preferred upper limit thereto is 130° C.

The stabilized fluoropolymer production method according to the invention can reduce the number of unstable terminal groups, for example, to 10 or less per $10^6$ carbon atoms in the stabilized fluoropolymer obtained, and the number of unstable terminal groups per $10^6$ carbon atoms can be reduced preferably to 6 or less, more preferably to 4 or less.

The stabilized fluoropolymer production method according to the invention is to convert the unstable terminal groups which the fluoropolymer to be treated has to —$CF_2T$ groups (T being as defined above) which are stable, as mentioned above.

In the art, such conversion has been carried out in the manner of direct fluorination of the unstable terminal groups by an essentially one treatment operation, whereas the stabilized fluoropolymer production method (1) according to the invention, which comprises once converting the unstable terminal groups in the fluoropolymer to be treated to readily fluorinatable terminal group at a high conversion rate and then reacting the readily fluorinatable terminal groups with a fluorinating agent, can attain a very high rate of conversion of those unstable terminal groups to —$CF_2T$ groups (rate of conversion to —$CF_2T$). Such improvement in the rate of conversion to —$CF_2T$ can also be achieved by the stabilized fluoropolymer production method (2) according to the invention, which gives a fluoropolymer in which at least 90% of the unstable terminal groups are —CFTCOOZ groups (T and Z being as defined above) in the step P.

The rate of conversion of the unstable terminal groups to readily fluorinatable terminal groups can be further increased by preferably carrying out the step A or step P within the temperature range given above.

When the stabilized fluoropolymer production method according to the invention is carried out, the rate of conversion of the unstable terminal groups in the fluoropolymer to be treated to —$CF_2T$ groups can generally amount to 90% or higher, preferably 95% or higher.

When the unstable terminal groups represented by any one of the formulas (1) to (7) given hereinabove are treated with fluorine gas in the conventional manner, the problem of insufficient fluorination arises. A cause therefor is presumably that the unstable terminal groups are readily converted to such terminal groups as —COF and ester structures and the terminal groups after such conversion are stable in fluorine gas, so that a higher temperature and a longer period of time are required for the conversion thereof to —$CF_2T$ (T being as defined above).

The present invention finds value in that fluoropolymers having such unstable terminal groups as mentioned above are stabilized to a satisfactory extent under mild conditions.

According to the stabilized fluoropolymer production method of the invention, even when the fluoropolymer to be treated contains at least one unstable terminal group species selected from the group consisting of the groups represented by the formulas (1) to (7) given hereinabove, the stabilization treatment is carried out by converting the unstable terminal groups to —$CFTCOX^1$ or —CFTCOORx groups (T, $X^1$ and Rx being as defined above) by treatment with a halogenating agent, further converting those groups to —CFTCOOZ groups, or converting the fluoropolymer to a fluoropolymer in which at least 90% of the unstable terminal groups are —CFTCOOZ groups (T and Z being as defined above), by reaction with a degradation treatment agent and, thereafter, reacting the resulting polymer with a fluorinating agent, so that the stabilization treatment can be carried out efficiently under mild conditions.

The stabilized fluoropolymer production method according to the invention, which comprises the above-mentioned steps, can prevent such fluoropolymer damaging as main chain cleavage so far encountered in the art on the occasion of fluorination with heating at high temperatures.

The above-mentioned fluoropolymer damaging can be sufficiently prevented by controlling the temperature at which the halogenating agent or fluorinating agent is reacted with the fluoropolymer preferably within the range mentioned above in accordance with the present invention.

When the fluoropolymer to be treated is PFA, for instance, the stabilized fluoropolymer production method according to the invention can give a stabilized fluoropolymer whose MFR is preferably 0.1 to 200 (g/10 minutes), more preferably 1 to 80 (g/10 minutes).

The MFR, so referred to herein, is the value measured at a temperature of 372° C. under a load of 5 kg in accordance with ASTM D 3307.

The stabilized fluoropolymer production method according to the invention can be carried out within the above-mentioned temperature range and hardly produces such problems as fluoropolymer contamination due to corrosion of the apparatus or materials used and polymer chain cleavage of the fluoropolymer to be treated and, therefore, can give fluoropolymers excellent in chemical stability and in various physical properties such as optical characteristics including light transmissivity and in particular in electrical characteristics in the high-frequency region.

The stabilized fluoropolymer obtained by the stabilized fluoropolymer production method according to the invention is thus excellent in various physical characteristics and therefore is useful as a material for producing various coatings, coverings and various moldings. When it is used as a material for various products, the stabilized fluoropolymer may be supplemented with such an additive as a filler.

The stabilized fluoropolymer can be used, for example, as a covering material for fixing rolls in electrophotographic cameras, printers, copiers and so forth.

A tubular molded article formed using the stabilized fluoropolymer produced by the stabilized fluoropolymer production method according to the invention also constitutes an aspect of the present invention.

The tubular molded article is useful in particular in such fields as chemical industry, semiconductor manufacture, automobiles and information appliances.

Further, a covered electric wire comprising a core wire and a covering shielding the core wire in which the covering is formed using a stabilized fluoropolymer produced by the production method mentioned above also constituted an aspect of the present invention.

The core wire constituting the above-mentioned covered electric wire is not particularly restricted but may be any of those known in the art, for example a copper wire.

An optically functional material characterized in that it is formed using a stabilized fluoropolymer produced by the above-mentioned stabilized fluoropolymer production method according to the invention also constitutes an aspect of the present invention.

The optically functional material according to the invention is not particularly restricted but is useful, for example, as an optical waveguide material or a like optical device material, a sealant material necessary for optical device processing, a lens material or a light-emitting device and is also useful as an antireflective layer material or a like optical material for display devices.

The stabilized fluoropolymer in the optically functional material according to the invention is preferably a copolymer derived from TFE and a perfluoro-1,3-dioxole derivative.

As the fields of application as the optical device material, there may be mentioned herein optical amplifier devices, optical switches, optical filters, light branching devices and wavelength converting devices, together with other arbitrary devices. Further, optical circuits comprising a light branching device including an N-fold branched waveguide (N being an integer not smaller than 2) in combination with such a device as mentioned above will be very useful in the coming highly advanced information communication society. These devices, when properly combined, can be utilized as optical routers, ONUs (optical network units), OADMs (optical add-drop multiplexers), media converters and the like. The optical waveguide devices may properly have the planar, strip, ridge or embedded form, for instance, according to the intended use thereof.

An optical waveguide comprising a core and a clad and characterized in that at least one of the core and clad is formed by using a stabilized fluoropolymer produced by the stabilized fluoropolymer production method according to the invention also constitutes an aspect of the present invention.

The clad refers to a circuit formed on a substrate and having a higher refractive index, while the clad refers to a portion formed around the core and having a lower refractive index. Since the above-mentioned stabilized fluoropolymer generally has a low refractive index, the fluoropolymer is preferably used in forming at least the core in the optical waveguide according to the invention.

The optical waveguide according to the invention can be produced by such a known method as etching, photobleaching or injection molding.

The optical waveguide according to the invention is high in optical transmission speed since at least one of the core and clad thereof is formed from the above-mentioned stabilized fluoropolymer.

As the fields of application as the sealant material required for optical device processing, there may be mentioned, for example, packaging (sealing) and surface mounting of such optically functional devices as light emitting diodes (LEDs), EL (electroluminescent) devices, nonlinear optical devices and other light-emitting devices or light-receiving devices. Sealed optical devices are used in various places; as non-limiting examples, there may be mentioned high mount strap lamps, meter panel or mobile phone backlights, light sources for remote control devices for various electric appliances and like light-emitting devices; light-receiving devices for auto-focusing of cameras and for light pickup for CDs/DVDs. The fluoropolymer is also useful as a matrix polymer of color rendering members for use in white LEDs.

The light-emitting device mentioned above includes, among others, EL devices, polymer light-emitting diodes, light-emitting diodes, optical fiber lasers, laser devices, optical fibers, liquid crystal backlights and photodetectors, and these are used in large-sized displays, illuminators, liquid crystal devices, optical disks, laser printers, lasers for medical use, laser processors, printers, copying machines and so forth.

As for the above-mentioned lens material, there may be mentioned pickup lenses, spectacle lenses, camera lenses, Fresnel lenses for projectors and contact lenses, among others.

As for the above-mentioned optical material for displays, there may be mentioned antireflective materials, illuminator coverings, display-protecting sheets, transparent cases, display boards, automotive parts and so forth.

The fluoropolymer can also be used in the form of optical disk substrates, among others.

An antireflective layer material formed by using a stabilized fluoropolymer produced by the above-mentioned stabilized fluoropolymer production method according to the invention also constitutes an aspect of the invention.

Generally, the antireflective layer material is a material of the antireflective layer constituting an antireflective film. The antireflective film refers to a film formed on the display surface for the purpose of preventing the contrast of a picture on the liquid crystal display surface from decreasing and is made of all or part of a plastic substrate, an acrylic hard coat layer, an antireflective layer and an antifouling coat layer in the order from the display surface. While it is preferred that the antireflective layer material be low in refractive index from the viewpoint of reducing the reflectivity of the screen, the stabilized fluoropolymer obtained by using the production method according to the invention is low in refractive index and high in transparency and therefore is superior as an antireflective layer material to the conventional organic materials.

An injection-molded article formed using a fluoropolymer and characterized in that the fluoropolymer is a stabilized fluoropolymer produced by the stabilized fluoropolymer production method according to the invention also constitutes an aspect of the present invention.

The injection molding for the formation of the injection-molded article according to the invention can be carried out in the conventional manner, without any particular restriction. When the stabilized fluoropolymer is PFA, the injection molding is preferably carried out at a molding temperature of 320 to 420° C.

Such injection-molded articles can be favorably used as various housings, joints and bottles, for instance.

EFFECTS OF THE INVENTION

The stabilized fluoropolymer production method according to the invention, which has the constitution described above, can stabilize unstable terminal groups under mild and economical reaction conditions.

Since the above-mentioned production method can be carried out under mild reaction conditions, restrictions on the apparatus and materials to be used can be lightened, and the apparatus and materials are less corroded and, therefore, it is possible to reduce fluoropolymer contamination by corrosion products. Furthermore, the stabilized fluoropolymer obtained by the above-mentioned production method has not undergone degradation since it is a product of stabilization under mild reaction conditions; thus, it is excellent in various physical properties. The stabilized fluoropolymer is useful in particular in the form of materials for the semiconductor industry, optically functional materials, covered electric wires, optical waveguides, antireflective layer materials and injection-molded articles, among others.

BEST MODES FOR CARRYING OUT THE INVENTION

The following examples illustrate the present invention in further detail. These examples are, however, by no means limitative of the present invention.

The MFR and melting point of each fluoropolymer are the values measured respectively by the following methods.

1. MFR

MFR measurements were carried out according to ASTM D 3307. More specifically, the melt indexer Series 4000 (product of Yasuda Seiki Seisakusho) was set at a measurement temperature of 372° C., a mass of 6.0 to 6.5 g of each sample was fed thereto and, after the lapse of 5 minutes of preheating, a molten strand was extruded under a load of 5 kg. The molten strand was cut at intervals of a fixed time (about 5 to 30 seconds) for collection. The thus-collected molten strand samples were sufficiently cooled and the MFR (unit: g/10 minutes) was calculated according to the following formula:

$$MFR = (M \times 600)/T$$

(In the formula, M represents the mass (unit: g) of the sample collected and T represents the sample collection time (unit: sec).)

2. Melting Point

Measurements were made according to ASTM D 4591. More specifically, a mass of about 3 mg of each sample was heated from 200° C. to 350° C. at a programming rate of 10° C./minute under a nitrogen stream using a differential scanning calorimeter (RDC 220, product of SII Nano Technology) and the melting point was determined from the point of inflection on the endothermic curve obtained.

EXAMPLE 1

1. Step A

A 300-ml stainless steel autoclave was charged with 50 g of pellets of a fluoropolymer (MFR: 12.5 (g/10 minutes), melting point: 303° C.) consisting of 94.3% by mass of tetrafluoroethylene [TFE] units and 5.7% by mass of perfluoro(propyl vinyl ether) [PPVE] units. The autoclave was hermetically sealed and, after airtightness testing, the pressure was reduced to about 1.3 kPa using a vacuum pump and then returned to ordinary pressure with nitrogen gas; this procedure was repeated 10 times. The autoclave was then heated on an oil bath and, after confirmation of arrival of the inside temperature at 180° C., the autoclave was again evacuated, a gas prepared by diluting fluorine gas (purity 99.7% by mass) to 20% by mass (15.4% by volume) with nitrogen was introduced into the autoclave until arrival at a gage pressure of 0.01 MPa and the reaction was thus allowed to start. After 1.5 hours from the start of the reaction, evacuation was carried out and fluorine gas immediately introduced into the autoclave until arrival of the gage pressure at 0.01 MPa to thereby feed the autoclave inside with fluorine gas in a sufficient amount for the reaction.

After the lapse of 3 hours from the start of the reaction, evacuation was carried out swiftly, nitrogen gas was introduced until arrival of the gage pressure at 0.01 MPa and the autoclave was cooled. After cooling to 60° C. or below, about 50 g of a fluoropolymer sample was recovered.

Separately, the above whole procedure was carried out twice. A total of 150 g of a fluoropolymer sample (hereinafter referred to as "Sample 1") was thus obtained.

2. Step B

The Sample 1 (about 150 g) obtained in the above manner was contacted with steam under the conditions of 121° C. and a gage pressure of 0.1 MPa for 6 hours using a sterilizer (model IST-50, product of Chiyoda Seisakusho) and then allowed to cool to room temperature to give a sample (Sample 2).

3. Step C

A 30-ml small-sized tubular reactor was packed with 20 g of the Sample 2 obtained as mentioned above, the pressure was reduced to about 1.3 kPa using a vacuum pump and then returned to ordinary pressure with nitrogen gas, nitrogen gas was passed through the reactor at a flow rate of 50 ml/minute for 10 minutes and then the temperature was raised to 180° C. in an air bath. After stabilization of the temperature, the above-mentioned gas prepared by diluting fluorine gas with nitrogen was passed through the reactor at a rate of 42 ml/minute for 3 hours. Immediately after completion of the reaction, the reactor inside was evacuated using a vacuum pump, the pressure was returned to ordinary pressure with nitrogen gas and, then, nitrogen gas was passed through the reactor at a rate of 50 ml/minute. After 10 minutes of passage, the heat source of the air bath was turned off and the reactor was cooled to room temperature. The thus-stabilized fluoropolymer was taken out of the reactor tube and designated as Sample 3.

COMPARATIVE EXAMPLE 1

Fluoropolymer treatment was carried out in the same manner as in Example 1 except that the reaction time in step A was 15 hours and that the step B and step C were omitted. A sample (Sample 4) was thus obtained.

During the reaction in step A, evacuation was carried out at 1.5-hour intervals, each time immediately followed by introduction of fluorine gas to a gage pressure of 0.01 MPa to thereby feed the autoclave inside with fluorine gas in a sufficient amount for the reaction.

COMPARATIVE EXAMPLE 2

Fluoropolymer treatment was carried out in the same manner as in Comparative Example 1 except that, in step A, the reaction temperature was 200° C. and the reaction time was 9 hours. A sample (Sample 5) was thus obtained.

The samples respectively obtained in Example 1, Comparative Example 1 and Comparative Example 2 were subjected to the following analysis.

Method of Analysis

A pellet of each sample obtained was cut to halves using a cutter knife and one half was extended using a hydraulic press to give a film with a thickness of about 0.25 to 0.30 mm.

The film obtained was analyzed by Fourier transform infrared spectroscopy in the wave number range of 400 to 4000 $cm^{-1}$.

A difference spectrum between the sample and a standard sample obtained by a sufficient extent of fluorination so as to show no longer any substantial difference in spectrum was obtained, the absorbance at the wave number assignable to each unstable terminal group was read, and the number of unstable terminal groups per $10^6$ carbon atoms was calculated according to the following formula:

Number of terminal groups per $10^6$ carbon atoms=$I \times K/t$.

(In the above formula, I is the absorbance, K is the correction factor shown in Table 1, and t is the thickness (in mm) of the film subjected to measurement.)

As for —$CF_2COOH$, the sum of the two values calculated according to the above formula for the two wave numbers assignable to —$CF_2COOH$ as shown in Table 1 was taken as the number of terminal —$CF_2COOH$ groups per $10^6$ carbon atoms.

When the number of terminal groups per $10^6$ carbon atoms as calculated using the above calculation formula is less than 1, the result is regarded as below the detection limit in the present measurement method, although the presence of an unstable terminal group or groups itself is not denied.

TABLE 1

| Unstable terminal group | Wave number ($cm^{-1}$) | Correction factor |
|---|---|---|
| —$CF_2COF$ | 1880 | 405 |
| —$CF_2COOH$ | 1815 | 455 |
|  | 1779 |  |
| —$CF_2COOCH_3$ | 1789 | 355 |
| —$CF_2CONH_2$ | 3436 | 480 |
| —$CF_2CH_2OH$ | 3648 | 2325 |

The Fourier transform infrared spectrometer used for the above-mentioned Fourier transform infrared spectroscopy was Perkin-Elmer's model Spectrum One spectrometer, and the number of scans was 8.

The respective measurement results are shown in Table 2.

TABLE 2

|  |  |  |  | Example 1 | | | Compar. Ex. 1 | Compar. Ex. 2 |
|---|---|---|---|---|---|---|---|---|
|  |  |  | Fluoropolymer to be treated | Sample 1 | Sample 2 | Sample 3 | Sample 4 | Sample 5 |
| Conditions | Step A(Note 1) |  | — |  | 180° C. × 3 hr |  | 180° C. × 15 hr | 200° C. × 9 hr |
|  | Step B(Note 2) |  | — | — | 121° C. × 6 hr |  | — | — |
|  | Step C(Note 1) |  | — | — | — | 180° C. × 3 hr | — | — |
| Number of terminal groups | —$CF_2CH_2OH$ | groups/C $10^6$ | 122 | 0 | 0 | 0 | 0 | 0 |
|  | —$CF_2COF$ | groups/C $10^6$ | 25 | 80 | 1 | 0 | 0 | 0 |
|  | —$CF_2COOH$ | groups/C $10^6$ | 0 | 0 | 92 | 0 | 0 | 0 |
|  | —$CF_2COOCH_3$ | groups/C $10^6$ | 82 | 0 | 2 | 0 | 0 | 0 |
|  | Total | groups/C $10^6$ | 229 | 80 | 95 | 0 | 0 | 0 |

(Note 1)Treatment with fluorine gas (purity 99.7% by mass) diluted to 20% by mass with nitrogen.

(Note 2)Treatment with steam.

As seen from the above analytical results, the total number of terminal —$CF_2CH_2OH$, —$CF_2COF$, —$CF_2COOH$ and —$CF_2COOCH_3$ groups in the fluoropolymer prior to step A was 229 per $10^6$ carbon atoms, whereas, in Sample 1, —$CF_2COF$ was the only unstable terminal group species and the frequency thereof was 80 per $10^6$ carbon atoms, which was greater by 25 as compared with the original sample. This indicates that other unstable terminal groups than —$CF_2COF$, namely —$CF_2CH_2OH$, —$CF_2COOH$ and —$CF_2COOCH_3$ groups, were respectively partly converted to —$CF_2COF$ by fluorination.

As for Sample 2 subjected to steam treatment, it was found that most (at least about 98%) of 80 —$CF_2COF$ groups per $10^6$ carbon atoms had been converted to —$CF_2COOH$.

Further, for Sample 3 subjected to fluorination at 180° C., it was revealed that the number of unstable terminal groups had been reduced to a level below the detection limit.

In Example 1, the number of unstable terminal groups could be reduced to a level below the detection limit by a total of 6 hours of fluorination in the step A and step C. On the contrary, in Comparative Example 1, in which the step A alone was carried out without carrying out the steam treatment in step B and the fluorinating agent treatment in step C, a fluorination reaction time as long as 15 hours was required to reduced the number of unstable terminal groups to a level below the detection limit.

Thus, it was confirmed that when the stabilized fluoropolymer production method according to the invention is employed, the fluorination reaction time required is at most half as compared with the prior art.

In Comparative Example 2 in which the reaction temperature in step A was set at 200° C. but the steps B and C were omitted, a fluorination reaction time as long as 9 hours was required to reduce the number of unstable terminal groups to a level below the detection limit.

Those methods according to which the fluorination is carried out at a high temperature of about 200° C. and the steps B and C are omitted, for example the method of Comparative Example 2, generally require a long period of time for the fluorination reaction, so that it is feared that the apparatus' life will be shortened due to corrosion and substances formed upon corrosion of the apparatus, for example such apparatus material corrosion products as chromium fluoride, nickel fluoride and iron fluoride, may cause polymer contamination and exert influences on various physical properties of polymers via polymer chain cleavage.

Further, in cases where those methods according to which the fluorination is carried out at a high temperature of about 200° C. and the steps B and C are omitted are carried out in large-sized reactors, the temperature distribution in the reactor becomes broad, so that a longer reaction time, a higher reaction temperature and a higher fluorine concentration are inevitably required and, as a result, the above-mentioned various influences become more significant. In view of the above, those methods according to which the fluorination is carried out at high temperatures and the steps B and C are omitted cannot be said to be industrially useful.

EXAMPLE 2

Fluoropolymer treatment was carried out in the same manner as in Example 1 except that, in step A, the reaction temperature was 160° C. and the reaction time was 6.5 hours and, in step C, the reaction temperature was 160° C. and the reaction time was 3 hours. On that occasion, the polymer obtained in step A was designated as Sample 6, the polymer obtained in the subsequent step B as Sample 7, and the polymer obtained in the further subsequent step C as Sample 8.

COMPARATIVE EXAMPLE 3

Fluoropolymer treatment was carried out in the same manner as in Example 2 except that the steam treatment in step B was omitted. The polymer obtained was designated as Sample 9.

COMPARATIVE EXAMPLE 4

Fluoropolymer treatment was carried out in the same manner as in Example 2 except that the reaction time in step A was 20 hours and the steps B and C were omitted. The polymer obtained was designated as Sample 10.

The samples obtained in Example 2, Comparative Example 3 and Comparative Example 4 were subjected to the above-mentioned analysis. The respective analytical results are shown in Table 3.

TABLE 3

| | | | Fluoropolymer to be treated | Example 2 Sample 6 | Example 2 Sample 7 | Example 2 Sample 8 | Compar. Ex. 3 Sample 9 | Compar. Ex. 4 Sample 10 |
|---|---|---|---|---|---|---|---|---|
| Conditions | Step A[Note 1] | | — | 160° C. × 6.5 hr | | | 160° C. × 6.5 hr | 160° C. × 20 hr |
| | Step B[Note 2] | | — | — | 121° C. × 6 hr | | — | — |
| | Step C[Note 1] | | — | — | — | 160° C. × 3 hr | 160° C. × 3 hr | — |
| Number of terminal groups | —$CF_2CH_2OH$ | groups/C $10^6$ | 122 | 0 | 0 | 0 | 0 | 0 |
| | —$CF_2COF$ | groups/C $10^6$ | 25 | 89 | 2 | 0 | 53 | 0 |
| | —$CF_2COOH$ | groups/C $10^6$ | 0 | 0 | 98 | 0 | 0 | 0 |
| | —$CF_2COOCH_3$ | groups/C $10^6$ | 82 | 0 | 2 | 0 | 0 | 0 |
| | Total | groups/C $10^6$ | 229 | 89 | 102 | 0 | 53 | 0 |

[Note 1] Treatment with fluorine gas (purity 99.7% by mass) diluted to 20% by mass with nitrogen.
[Note 2] Treatment with steam.

As shown by the results of Example 2, the stabilized fluoropolymer production method according to the invention, in spite of the fact that the reaction temperature in step A was 160° C., could reduce the number of unstable terminal groups to a level below the detection limit by a total of 9.5 hours of fluorination in the step A and step C.

On the contrary, in Comparative Example 4 in which the step A alone was carried out and the steam treatment in step B and the fluorinating agent treatment in step C were omitted, a fluorination reaction time as long as 20 hours was required to reduce the number of unstable terminal groups to a level below the detection limit. Thus, it was revealed that the stabilized fluoropolymer production method according to the invention, even when the reaction temperature in step A is relatively low, namely 160° C., requires at most half the fluorination reaction time required in the prior art.

Further, the stabilized fluoropolymer production method according to the invention could succeed in reducing the number of unstable terminal groups by carrying out the step C following the step B, as ascertained in Example 1 and Example 2. On the contrary, in Comparative Example 3 in which the step B was omitted, 53-$CF_2COF$ groups per $10^6$ carbon atoms remained in the fluoropolymer (Sample 9) after completion of the step C, clearly indicating the effect of the steam treatment in step B.

Accordingly, the production methods described in the above Examples are useful as methods of stabilizing fluoropolymers while retaining excellent physical properties thereof.

EXAMPLE 3

The procedure of Example 1 was followed in just the same manner except for the following points. The fluoropolymer to be treated used was a powder of a fluoropolymer made of 96.0% by mass of TFE and 4.0 by mass of PAVE (MFR: 25 (g/10 minutes)).

In the step A, $SF_4$ (purity 94% by mass) was used as the halogenating agent in lieu of the gas prepared by diluting fluorine gas with nitrogen and the reaction was carried out at a temperature of 120° C. for 4 hours to give Sample 11. In the step B, the size of the sample treated was 50 g and Sample 12 was obtained. In the step C, the reaction was carried out at 140° C. for 5 hours to give Sample 13. Further, the respective samples were subjected to the test mentioned above.

The results of analysis of the samples obtained are shown in Table 4.

It was revealed that the use of $SF_4$ makes it possible to convert —$CF_2COOH$ to —$CF_2COF$ rapidly under mild conditions even if highly reactive fluorine gas is not used.

EXAMPLE 4

1. Step P

A 300-ml stainless steel autoclave was charged with 50 g of pellets of a fluoropolymer made of 96.5% by mass of TFE and 3.5% by mass of PAVE (MFR: 12.5 (g/10 minutes)). The autoclave was heated on an oil bath and, after confirmation of arrival of the inside temperature at 100° C., ozone wetted with water vapor was fed from an EcoDesign model ED-OG-R4 ozone generator at a flow rate of 10 g/hour. After 15 hours of treatment, evacuation was immediately carried out and nitrogen gas was introduced to a gage pressure of 0.01 MPa, followed by cooling. After cooling to 60° C. or below, about 50 g of the treated polymer sample was recovered and designated as Sample 14.

2. Step Q

A 30-ml small-sized tubular reactor was packed with 20 g of the above-mentioned Sample 14, the pressure was first reduced to about 1.3 kPa using a vacuum pump and then returned to ordinary pressure with nitrogen gas, nitrogen gas was passed through the reactor at a flow rate of 50 ml/minute for 10 minutes and then the temperature was raised to 160° C. in an air bath. After stabilization of the temperature, the above-mentioned gas prepared by diluting fluorine gas with nitrogen was passed through the reactor at a rate of 42 ml/minute for 3 hours. After completion of the reaction, the reactor inside was immediately evacuated using a vacuum pump, the pressure was returned to ordinary pressure with nitrogen gas and, then, nitrogen gas was passed through the reactor at a rate of 50 ml/minute. After 10 minutes of passage, the heat source of the air bath was turned off and the reactor was cooled to room temperature. The thus-treated fluoropolymer was taken out of the reactor tube and designated as Sample 15.

The results of analysis of the sample obtained are shown in Table 5.

It was revealed that the ozone treatment can cause conversion to a fluoropolymer in which —$CF_2COOH$ groups account for 99% or more of unstable terminal groups. It was also revealed that the fluoropolymer obtained by that treatment can give a stabilized fluoropolymer under mild conditions, as in the other Examples.

TABLE 4

| | | | | Example 3 | | |
| --- | --- | --- | --- | --- | --- | --- |
| | | | Fluoropolymer to be treated | Sample 11 | Sample 12 | Sample 13 |
| Conditions | Step A[Note 1] | | — | 120° C. × 4 hr | | |
| | Step B[Note 2] | | — | — | 121° C. × 6 hr | |
| | Step C[Note 3] | | — | — | — | 140° C. × 5 hr |
| Number of terminal groups | —$CF_2CH_2OH$ | groups/C $10^6$ | 0 | 0 | 0 | 0 |
| | —$CF_2COF$ | groups/C $10^6$ | 12 | 381 | 1 | 2 |
| | —$CF_2COOH$ | groups/C $10^6$ | 350 | 0 | 398 | 0 |
| | —$CF_2COOCH_3$ | groups/C $10^6$ | 0 | 0 | 0 | 0 |
| | Total | groups/C $10^6$ | 362 | 381 | 399 | 0 |

[Note 1] Treatment with $SF_4$ (purity 94% by mass).
[Note 2] Treatment with steam.
[Note 3] Treatment with fluorine gas (purity 99.7% by mass) diluted to 20% by mass with nitrogen

TABLE 5

| | | | Example 4 | | |
|---|---|---|---|---|---|
| | | | Fluoropolymer to be treated | Sample 14 | Sample 15 |
| Conditions | Step P[Note 1] | | — | 100° C. × 15 hr | |
| | Step Q[Note 2] | | — | — | 160° C. × 3 hr |
| Number of terminal groups | —CF$_2$CH$_2$OH | groups/C 10$^6$ | 103 | 0 | 0 |
| | —CF$_2$COF | groups/C 10$^6$ | 10 | 2 | 0 |
| | —CF$_2$COOH | groups/C 10$^6$ | 38 | 317 | 0 |
| | —CF$_2$COOCH$_3$ | groups/C 10$^6$ | 36 | 0 | 0 |
| | Total | groups/C 10$^6$ | 187 | 319 | 0 |

[Note 1] Treatment with ozone.

[Note 2] Treatment with fluorine gas (purity 99.7% by mass) diluted to 20% by mass with nitrogen

INDUSTRIAL APPLICABILITY

The stabilized fluoropolymer production method according to the invention, which has the constitution described above, can stabilize unstable terminal groups under mild and economical reaction conditions.

Since the above-mentioned production method can be carried out under mild reaction conditions, restrictions on the apparatus and materials to be used can be lightened, and the apparatus and materials are less corroded and, therefore, it is possible to reduce fluoropolymer contamination by corrosion products. Furthermore, the stabilized fluoropolymer obtained by the above-mentioned production method has not undergone degradation since it is a product of stabilization under mild reaction conditions; thus, it is excellent in various physical properties. The stabilized fluoropolymer obtained by the above-mentioned production method is useful in particular in the form of materials for the semiconductor industry, optically functional materials, covered electric wires, optical waveguides, antireflective layer materials and injection-molded articles, among others.

The invention claimed is:

1. A method for producing a stabilized fluoropolymer comprising subjecting a fluoropolymer to be treated containing no —SO$_2$X (X representing F or Cl) group-containing monomer units to the following step A, step B and step C in that order:
   A: Step of reacting with a halogenating agent;
   B: Step of reacting with a degradation treatment agent;
   C: Step of reacting with a fluorinating agent.

2. The method for producing a stabilized fluoropolymer according to claim 1, wherein:
   the step A is a step A1 of converting the unstable terminal groups to readily degradable terminal groups by reacting with a halogenating agent;
   the step B is a step B1 of converting the above-mentioned readily degradable terminal groups to —CFTCOOZ groups (in which T represents F, a perfluoroalkyl group or a perfluoroalkoxy group and Z represents H, NR$^1$R$^2$R$^3$R$^4$ or an alkali metal element; R$^1$, R$^2$, R$^3$ and R$^4$ may be the same or different and each represents H or an alkyl group containing 1 to 4 carbon atoms; the above-mentioned perfluoroalkyl or perfluoroalkoxy group may contain at least one ether oxygen [—O—]) by reacting with a degradation treatment agent; and
   the step C is a step C1 of converting the above-mentioned —CFTCOOZ groups to —CF$_2$T groups (T and Z being as defined above) by reaction with a fluorinating agent.

3. The method for producing a stabilized fluoropolymer according to claim 2, wherein the readily degradable terminal group species comprises at least one species selected from the groups consisting of —CFTCOX$^1$ (T being as defined above and X$^1$ representing F or Cl) and —CFTCOORx (T being as defined above and Rx representing a haloalkyl group).

4. The method for producing a stabilized fluoropolymer according to claim 1, wherein the halogenating agent comprises at least one species selected from the group consisting of F$_2$, NF$_3$, SF$_4$, PF$_5$, IF$_5$, IF$_7$, Br$_2$, BrF$_3$, BrF$_5$, AgF$_2$, CoF$_3$, K$_3$NiF$_7$, Cl$_2$, SCl$_2$, SCl$_4$, PCl$_3$, POCl$_3$, PCl$_5$, ClF and ClF$_3$.

5. The method for producing a stabilized fluoropolymer according to claim 1, wherein the reaction with the halogenating agent is carried out at 0 to 180° C.

6. The method for producing a stabilized fluoropolymer according to claim 1, wherein the degradation treatment agent is a liquid degradation treatment agent or gaseous degradation treatment agent comprising water, a fluoroalcohol or a mixture containing these.

7. A method for producing a stabilized fluoropolymer comprising subjecting a fluoropolymer to be treated containing no —SO$_2$X (X representing F or Cl) group-containing monomer units to stabilization treatment,
   said stabilization treatment comprises the following steps P and Q:
   P: Step of obtaining a fluoropolymer in which at least 90% of the unstable terminal groups are —CFTCOOZ groups (in which T represents F, a perfluoroalkyl group or a perfluoroalkoxy group; the perfluoroalkyl group or perfluoroalkoxy group may contain at least one ether oxygen (—O—); Z represents H, NR$^1$R$^2$R$^3$R$^4$ or an alkali metal element; R$^1$, R$^2$, R$^3$ and R$^4$ may be the same or different and each represents H or an alkyl group containing 1 to 4 carbon atoms);
   Q: Step of converting the above-mentioned —CFTCOOZ to —CF$_2$T (T and Z being as defined above) by reaction with a fluorinating agent.

8. The method for producing a stabilized fluoropolymer according to claim 1, wherein the fluorinating agent comprises at least one fluorine source selected from the group consisting of F$_2$, NF$_3$, SF$_4$, PF$_5$, IF$_5$, IF$_7$, BrF$_3$, BrF$_5$, ClF, ClF$_3$, AgF$_2$, CoF$_3$ and K$_3$NiF$_7$.

* * * * *